Figure 1:
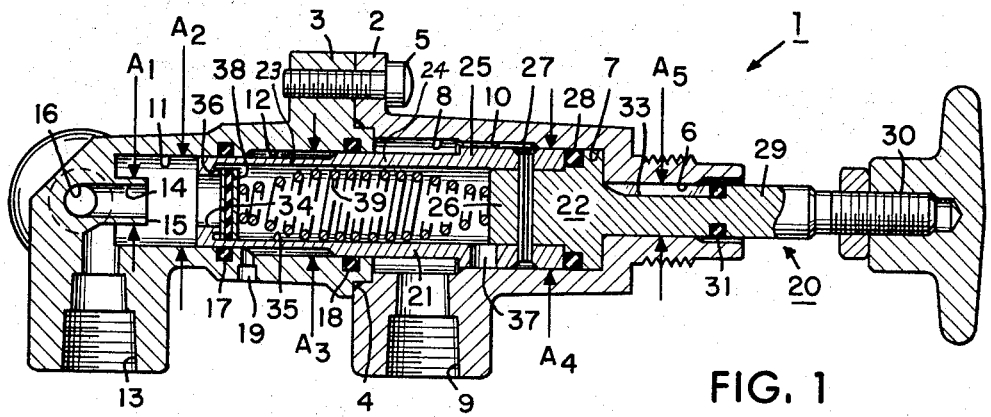

Jan. 30, 1968　　　R. C. BUELER　　　3,366,142

MULTI-POSTION CONTROL VALVE

Filed Oct. 23, 1965

INVENTOR
RICHARD C. BUELER
BY
Joseph E. Papin

United States Patent Office 3,366,142
Patented Jan. 30, 1968

3,366,142
MULTI-POSITION CONTROL VALVE
Richard C. Bueler, Glendale, Mo., assignor, by mesne assignments, to Wagner Electric Corporation, South Bend, Ind., a corporation of Delaware
Filed Oct. 23, 1965, Ser. No. 503,231
18 Claims. (Cl. 137—627.5)

This invention relates to control valves and in particular to those having push-pull type actuation.

In the past, a well-known device for effecting the energization of vehicle brakes in a vehicle fluid pressure system was a spring set brake chamber having a service portion responsive to service fluid pressure metered thereto from a system fluid pressure source to effect normal service energization of said vehicle brakes and having an emergency or parking portion including resiliently urged means responsive to fluid pressure less than a predetermined value supplied thereto from said system fluid pressure source to mechanically actuate said service portion and effect emergency energization of said vehicle brakes. A push-pull control valve of a well-known type was connected between the emergency portion of the spring set brake chamber and the system fluid pressure source, and said push-pull control valve was operable between one position connecting the emergency portion of said spring set brake chamber in open pressure fluid communication with said system fluid pressure source to disable said resiliently urged means and another position interrupting pressure fluid communication therebetween and venting said emergency portion of said spring set brake chamber to the atmosphere to effect actuation of said resiliently urged means and simulate emergency energization of the vehicle brakes. One of the disadvantageous or undesirable features of such past push-pull control valves was that they did not afford the operator a "feel" as to the extent or intensity of the simulated emergency energization of the vehicle brakes. Another disadvantageous or undesirable feature of such past push-pull control valves was the inability thereof to meter or modulate in response to the operator-applied actuating force thereon.

The object of the present invention is to provide a control valve having push-pull type actuation which overcomes the aforementioned, as well as other, disadvantageous or undesirable features of such past push-pull control valves. This, as well as other objects and advantages of the present invention, will become apparent hereinafter.

Briefly, the invention embodies a control valve having application means movable therein in one direction to control the application of fluid pressure through said control valve of fluid pressure supplied thereto, said application means also being movable in another direction to a position isolating the applied fluid pressure from the supplied fluid pressure and effecting a reduction of the applied fluid pressure, and opposed effective areas on said application means respectively responsive to the isolated supplied fluid pressure and the applied fluid pressure to provide a reaction force in opposition to movement of said application means in the other direction.

Figure 2:
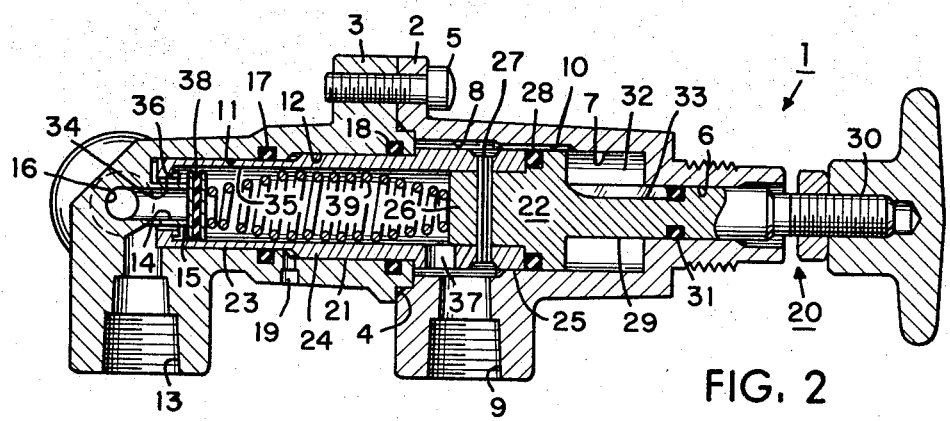
Figure 3:
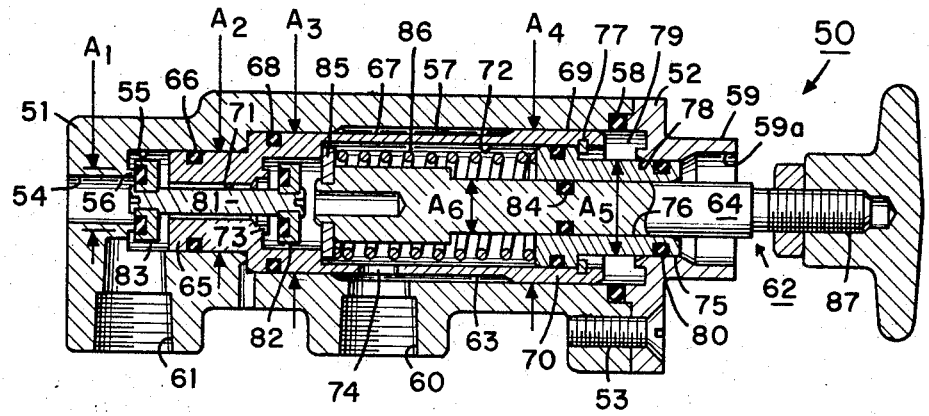

In the drawings which illustrate embodiments of the invention,

FIG. 1 is a sectional view showing a control valve embodying the present invention in the "out" position thereof in cross-section, FIG. 2 is another sectional view showing the control valve of FIG. 1 in the "in" position thereof in cross-section, and FIG. 3 is a sectional view showing another control valve embodying the present invention in the "in" position thereof in cross-section.

Referring now to FIG. 1 in detail, a control or push-pull valve 1 is provided with right and left housings 2, 3 having a seal 4 interposed therebetween, and said housings are interconnected by suitable means, such as a plurality of screws 5. The housing 2 is provided with a bore 6 therein in axial alignment with a pair of stepped counterbores 7, 8, and an inlet port 9 is provided in the housing 3 intersecting with the counterbore 8 for connection with a fluid pressure source (not shown), said housing stepped counterbores having a recess or groove 10 therebetween. The housing 3 is provided with a pair of stepped bores 11, 12 which are axially aligned with the bore and stepped counterbores 6, 7, 8 of the housing 2, and an outlet or delivery port 13 is also provided in the housing 3 intersecting the stepped bore 11 adjacent the leftward end thereof for connection with a fluid pressure responsive motor (not shown). An extension 14 is integrally provided in the housing 3 extending coaxially into the housing bore 11 and having a valve seat 15 on the free end thereof, and an exhaust port 16 is also provided in the housing 3 extending coaxially through said housing extension and said valve seat, said valve seat having a cross-sectional effective area $A_1$. A pair of seals 17, 18 are respectively provided in the housing stepped bores 11, 12 adjacent the rightward ends thereof, and a vent port 19 is provided in the housing 3 intersecting the housing stepped bore 12 between said seals.

An application or valve member, indicated generally at 20, is provided with a stepped piston body 21 and plunger member 22. The smaller and intermediate portions 23, 24 of the piston 21 are respectively slidable in the housing stepped bores 11, 12 in sealing engagement with the seals 17, 18 and defining therewith cross-sectional areas $A_2$, $A_3$, respectively, and the larger portion 25 of said piston is slidable in the housing counterbore 7. The piston larger portion 25 is connected with an interior end 26 of the plunger member 22 by suitable means, such as a pin 27, and a peripheral seal 28 is carried between said plunger member and piston larger portion, said peripheral seal defining a valve element for sealing engagement with the housing counterbore 7. The plunger 22 is provided with an integral extension 29 which is slidably received in the housing bore 6 having an applied force receiving end 30 exteriorly of the housing 2, and a peripheral seal 31 is provided on said extension defining a valve element for sealing engagement with the housing bore 6. The piston larger portion 25 and plunger 22 define with the housing counterbore 7 a fluid pressure chamber 32 which is isolated from the inlet port 9 when the seal 28 is engaged with the housing counterbore 7, and an undercut or passage 33 is provided in the extension 29 to normally vent said chamber to atmosphere through the housing bore 6. The peripheral seals 28, 31 respectively define cross-sectional areas $A_4$, $A_5$ on the application member 20, said area $A_4$ being greater than the area $A_3$ or the area $A_5$, and the fluid pressure at the inlet port 9 acts on the difference between areas $A_3$ and $A_4$ to establish a holding force $F_1$ to normally maintain the application member 20 in its "out" position when the chamber 32 is vented to the atmosphere.

A pair of stepped bores 34, 35 are axially provided through the piston 21 defining a valve seat 36 at the juncture thereof, the plunger interior end 26 being fixedly received in the rightward end of the piston stepped bore 35, as previously mentioned. A radially extending cross-passage 37 is provided in the piston 21 and defines with the piston stepped bores 34, 35 a passage between the inlet and outlet ports 9, 13, said cross-passage having one end intersecting with the piston stepped bore 35 and the other end thereof in open pressure fluid communication with said inlet port. A valve member or element 38 is normally urged into sealing engagement with the piston valve seat 36 by a spring 39 to isolate the inlet port 9 from the outlet port 13, said spring being biased between said valve member and the plunger interior end 26. To complete the description of the control valve 1, it should be noted that the difference between areas $A_3$ and $A_2$ is equal to or greater than the area $A_5$, and the difference between areas $A_3$ and $A_5$ is greater than the difference between areas $A_1$ and $A_2$.

In the operation of the control valve 1 with the component parts thereof in their "out" positions, as above described and as shown in FIG. 1, an operator-applied force in a leftward direction on the exterior end 30 of the plunger 29 and greater than the opposing holding force $F_1$ moves the piston and plunger 21, 22 leftwardly to initially sealably engage the seal 31 with the housing bore 6 isolating the chamber 32 from the atmosphere and subsequently disengage the seal 28 from the housing counterbore 7 to establish pressure fluid communication between said chamber and the inlet port 9 through the housing counterbore and recess 8, 10. When the chamber 32 and inlet port 9 are so connected in pressure fluid communication, the holding force $F_1$ is eliminated, and the fluid pressure at said inlet port acts on the difference between areas $A_3$ and $A_5$ to establish another force $F_2$ which is additive to the leftwardly applied force to urge the application member 20 toward its "in" position as shown in FIG. 2. Further leftward movement of the application member 20 in response to the leftwardly applied force and the force $F_2$ initially sealably engages the valve member 38 with the exhaust port seat 15 to interrupt pressure fluid communication between the outlet and exhaust ports 13, 16 and subsequently disengages the piston valve seat 36 from said valve member, the leftward movement of said application member toward its "in" position being limited upon the abutment thereof with the end wall of the housing stepped bore 11. With the valve member 38 closing the exhaust port 16 and disengaged from the piston valve seat 36, fluid pressure flows from the inlet port 9 through the housing counterbore 8, the piston cross-passage 37 and stepped bores 34, 35 into the housing stepped bore 11 and therefrom to the outlet port 13, and the assisting or additive force $F_2$ is now changed to a leftwardly directed holding force $F_3$ to maintain the application member 20 in its "in" position, said holding force $F_3$ being defined by the substantially equal fluid pressures at said inlet and outlet ports acting on the effective area $A_3$–$A_2$ in opposition to the effective area $A_5$. It should be noted that the assisting force $F_2$ is effective to move the application member 20 to its "in" position independently of the applied force; therefore, the applied force may be removed from said application member, if desired, subsequent to the establishment of said assisting force $F_2$.

In the event the operator desires to decrease or exhaust the fluid pressure at the outlet port 16, a rightwardly directed manual force is applied by the operator on the exterior end 30 of the application member 20 to overcome the holding force $F_3$ and move said application member toward its "out" position. This rightward movement of the application member 20 initially re-engages the piston valve seat 36 with the valve member 38 to isolate the inlet port 9 from the outlet port 16 and then moves said valve member to a piston disengaged from the exhaust valve seat 15 to re-establish pressure fluid communication between the outlet and exhaust ports 13, 16 thereby effecting metered pressure fluid flow from said outlet port through the housing stepped bore 11 to said exhaust port. Upon the reduction of fluid pressure at the outlet port 13 in this manner, the holding force $F_3$ is eliminated and a differential reaction force $F_4$ opposing further rightward movement of the application member 20 in response to the applied force thereon is established, said differential reaction force $F_4$ being defined by the isolated fluid pressure at the inlet port 9 acting on the effective area $A_2$–$A_1$ which was previously defined as being less than the effective area $A_3$–$A_5$. Since the isolated fluid pressure at the inlet port 9 acting on the effective area $A_3$–$A_5$ is substantially constant and the fluid pressure at the outlet port 13 acting on the lesser effective area $A_2$–$A_1$ is being reduced to a value less than that of the fluid pressure at the inlet port by the action of the rightwardly applied force, it is apparent that the differential force $F_4$ will increase in magnitude as the fluid pressure at said outlet port is further reduced. In other words, the magnitude of the reaction force $F_4$ is inversely proportional to the fluid pressure at the outlet port 16 when said outlet port is isolated from the inlet port 9.

When the applied force is increased to a magnitude overcoming the differential reaction force $F_4$, the valve member 38 is disengaged from the exhaust valve seat 15 to completely exhaust the fluid pressure at the outlet port 13, and the application member 20 is moved rightwardly toward its original "out" position to initially sealably re-engage the seal 28 with the housing counterbore 7 interrupting pressure fluid communication between the inlet port 9 and the housing chamber 32 and subsequently disengage the seal 31 from the housing bore 6 to vent said chamber to the atmosphere. With the chamber 32 vented to the atmosphere and the component parts of the control valve 1 in their original or "out" positions, the differential reaction force $F_4$ is eliminated and the holding force $F_1$ is re-established; therefore, the rightwardly applied force may be removed from the application member 20, and said holding force $F_1$ will again act to maintain said application member in its "out" position.

Referring now to FIG. 3, another control or push-pull valve 50 is shown having substantially the same component parts and functioning in substantially the same manner as the previously described control valve 1 with the following exceptions.

The control valve 50 is provided with a housing 51 having an end cap or closure member 52 connected with the rightward end thereof by suitable means, such as a plurality of screws 53. A bore and aligned counterbore 54, 55 are provided in the housing 51, and an exhaust valve seat 56 is defined on said housing at the juncture of said bore and counterbore having a cross-sectional area $A_1$. A stepped counterbore 57 is provided in the housing and end cap 51, 52 in alignment with the housing bore and counterbore 54, 55, and an annular seal 58 is positioned in the larger portion of said stepped counterbore 57 between said housing and end cap. The end cap 52 is provided with a centrally located hub or extension portion 59 having an axial stepped bore 59a therethrough, said hub bore having one end connecting with the stepped counterbore 57 and the other end thereof open to the atmosphere. Inlet and outlet ports 60, 61 are provided in the housing 51 intersecting the housing counterbore and bore 57, 55 for connection with a fluid pressure source and fluid pressure responsive motor (not shown), respectively.

An application or valve member, indicated generally at 62, is provided with a stepped piston body or member 63 and a plunger member 64. The smaller portion 65 of the piston 63 is slidable in the housing counterbore 55 and carries a peripheral seal 66 in sealing engagement with said housing counterbore, said peripheral seal defining a cross-sectional area $A_2$ on said piston. The intermediate stepped portion 67 of the piston 63 is slidably received in the smaller portion of the housing stepped counterbore 55 and carries a peripheral seal 68 in sealing engagement therewith, said peripheral seal defining a cross-sectional area $A_3$ on said piston. A peripheral surface or valve member 69 is provided on the larger stepped portion 70 of the piston 63 and is slidably received in the larger portion of the housing stepped counterbore 57 normally in sealing engagement with the housing seal 58, said peripheral surface defining a cross-sectional area $A_4$ when engaged with said housing seal. A stepped bore 71 and counterbore 72 are axially provided through the piston 63, and a valve seat 73 is defined on said piston at the juncture of said piston stepped bore. A radially extending cross-passage 74 is provided through the piston 63 between the seal 68 and peripheral surface 69 having one end intersecting the piston counterbore 72 and the other end thereof in open pressure fluid communication with the inlet port 60 at all times, said piston cross-passage 74 and stepped bore and counterbore 71, 72 defining a passage for connection between the inlet and outlet ports 60, 61. A closure member 75 having an axial bore 76 therethrough is retained in the rightward end of the piston counterbore 72 against displacement by a snap ring and groove assembly 77 and is provided with an integral extension 78 which is slidably received in the end cap bore 59a. A chamber 79 is defined in the larger portion of the housing stepped counterbore 57 between the larger stepped portion 70 of the piston 63 and the end cap 52, and the engagement of the piston peripheral surface 69 with the housing seal 58 normally isolates said chamber from the inlet port 60. Another peripheral seal 80 is carried on the closure member extension 78 for sealing engagement with the end cap bore 59a defining a cross-sectional area $A_5$, and said seal 80 is normally disengaged from the end cap bore 59a to vent the chamber 79 to the atmosphere. When the piston peripheral surface 69 is engaged with the housing seal 58 to isolate the chamber 79 from the inlet port 60 and the piston seal 80 is disengaged from the end cap bore 59a to vent said chamber to atmosphere, the fluid pressure at said inlet port acts on the effective area $A_5-A_3$ to create a holding force $F_1$ which maintains the application member 62 in its rightward or "out" position.

A valve member 81 is shiftably disposed in the smaller portion of the piston stepped bore 71 having sealing elements 82, 83 on opposite ends thereof, said sealing element 82 being normally engaged with the piston valve seat 73 to isolate the inlet port 60 from the outlet port 61 and said sealing element 83 being disengaged from the exhaust valve seat 56 to vent the outlet port to atmosphere when the application member 62 is in its rightward or "out" position. The plunger 64 is slidably received in the closure member bore 76 and carries a peripheral seal 84 in sealing engagement therewith, said seal 84 defining a cross-sectional area $A_6$. The plunger 64 is also provided with an abutment or interior end 85, and a metering spring 86 is precompressed between said plunger and the piston closure member 75 to urge said plunger abutment into abutting engagement with the annular shoulder formed at the juncture of the piston stepped bore and counterbore 71, 72. To complete the description of the control valve 50, the plunger member 64 is also provided with an applied force receiving or exterior end 87 exteriorly of the end cap 52, and it should be noted that the difference between areas $A_3$ and $A_2$ is equal to or greater than the area $A_5$ while the difference between areas $A_3$ and $A_5$ is greater than the difference between areas $A_1$ and $A_2$.

In the operation of the control valve 50 with the component parts thereof in their "out" positions, as described above, a leftward applied force on the exterior end 87 of the plunger 64 greater than the opposing holding force $F_1$ moves the application member 62 leftwardly to initially sealably engage the seal 80 with the end cap bore 59a isolating the chamber 79 from the atmosphere and subsequently disengaging the piston peripheral surface 69 from the housing seal 58 to establish pressure fluid communication between said chamber and the inlet port 60 through the larger portion of the housing stepped counterbore 57. When the chamber 79 and inlet port 60 are so connected in pressure fluid communication, the holding force $F_1$ is eliminated, and the fluid pressure at said inlet port acts on the effective area $A_3-A_5$ to establish an assisting force $F_2$ which is additive to the leftward applied force to urge the application member 62 toward its "in" position as shown in FIG. 3. Further leftward movement of the application member 20 in response to the applied force and the force $F_2$ initially engages the valve element 83 with the exhaust valve seat 56 to interrupt pressure fluid communication between the exhaust and outlet ports 54, 61 and subsequently disengages the piston valve seat 73 from the valve element 82, the leftward movement of said application means toward its "in" position being limited upon the abutment thereof with the shoulder formed between the housing counterbores 55, 57. With the valve element 83 closing the exhaust port 56 and the valve element 82 disengaged from the piston valve seat 73, fluid pressure flows from the inlet port 60 through the housing counterbore 57, the piston cross-passage 74, counterbore 72 and stepped bore 71 into the housing bore 55 and therefrom to the outlet port 61, and the assisting force $F_2$ is now changed to a holding force $F_3$ to maintain said application member in the "in" position thereof, said holding force $F_3$ being defined by the substantially equal fluid pressures at said inlet and outlet ports acting on the effective area $A_3-A_2$ in opposition to the effective area $A_5$. It should be noted that the assisting force $F_2$ is effective to move the application member 62 to its "in" position independently of the applied force; therefore, the applied force may be removed from said application member 62, if desired, subsequent to the establishment of said assisting force $F_2$.

In the event the operator desires to decrease or exhaust the fluid pressure at the outlet port 61, a rightwardly directed manual force is applied by the operator on the exterior end 87 of the plunger 64 to move said plunger rightwardly relative to the piston 63 and against the compressive force of the metering spring 86. The rightward applied force is transmitted through the metering spring 86 to the piston 63 which, in turn, is moved rightwardly to re-engage the piston valve seat 73 with the valve element 82 isolating the fluid pressure at the inlet port 60 from that at the outlet port 61. Further rightward movement of the piston 62 is response to the applied force disengages the valve element 83 from the exhaust valve seat 56 to re-establish pressure fluid communication between the exhaust and outlet ports 54, 61 thereby effecting metered pressure fluid flow from said outlet port through the housing stepped bore 55 to said exhaust port. Upon the metered reduction of the fluid pressure at the outlet port 61 in this manner, the holding force $F_3$ is eliminated, and a differential reaction force $F_4$ opposing further rightward movement of the application member 62 in response to the applied force thereon is established, said differential reaction force $F_4$ being defined by the isolated fluid pressure at the inlet port 60 acting on the effective area $A_3-A_5$ and the reduced fluid pressure at the outlet port 61 acting on the opposing effective area $A_2-A_1$ which was previously defined as being less than the effective area $A_3-A_5$. Since the isolated fluid pressure at the inlet port 60 is substantially constant and the fluid pressure at the outlet port 61 is being reduced by the action of the rightwardly applied force, it is apparent that the differential reaction force $F_4$ across the piston 63 will increase in magnitude as the fluid pressure at said outlet port is reduced. In other words, the magnitude of the reaction force $F_4$ is inversely proportional to the fluid pressure at the outlet port 61 when said outlet port is isolated from the inlet port. Therefore, when the metered reduction of the fluid pressure at the outlet port 61 effects an increase in the magnitude of the reaction force $F_4$ to a value substantially equal to the rightwardly applied force, the piston 63 will move leftwardly against the metering spring 86 and relative to the plunger 64 to a position providing lapped engagement of the valve elements 82, 83 with their valve seats 73, 56. If the operator desires to effect further metered reduction of the fluid pressure at the outlet port 61, the rightwardly applied force is increased which results in a further increase of the reaction force $F_4$ in opposition thereto, and the component parts of the control valve 1 function in the same manner as above described to again position the valve elements 82, 83 in lapped engagement with their valve seats 73, 56.

If the operator now desires to completely exhaust the outlet port 61, the rightwardly directed applied force is increased to overcome the differential reaction force $F_4$ and move the piston 63 to its original or "out" position. The initial rightward movement of the piston 63 sealably re-engages the valve element 82 with the piston valve seat 73 isolating the inlet port 60 from the outlet port and thereafter disengages the valve element 83 from the exhaust valve seat 56 to completely exhaust the fluid pressure at said outlet port. Further rightward movement of the piston 63 against the differential reaction force $F_4$ initially sealably re-engages the piston peripheral surface 69 with the housing seal 58 to interrupt pressure fluid communication between the chamber 79 and the inlet port 60 and subsequently disengages the seal 80 from the end cap bore 59a to vent said chamber to atmosphere. When the chamber 79 is vented to atmosphere, the differential reaction force $F_4$ is eliminated, and the holding force $F_1$ is re-established; therefore, the rightwardly directed applied force may be removed from the plunger 64, and said holding force $F_1$ will again act to maintain the piston 63 in its "out" position. Of course, the compressive force of the metering spring 86 will move the plunger 64 to its original "out" position with the interior end 85 thereof engaged with the piston 63 upon the removal of the rightward applied force.

From the foregoing, it is now apparent that novel control valves 1 and 50 metering the objects set out hereinbefore are provided and that changes or modifications as to the precise configurations, shapes or details of the constructions and operations thereof may be made by those skilled in the art without departing from the spirit of the invention, as defined by the claims which follow.

The embodiments of the invention in which an exclusive property or privilege is claimed are defined as follows:

1. A control valve comprising a housing, application means movable in said housing and defining therewith a pressure fluid flow passage for connection between a fluid pressure source and a fluid pressure responsive motor, said application means being movable in one direction in response to an applied force to a position in said flow passage effecting the application of pressure fluid flow therethrough, said application means also being movable in an opposite direction in response to another applied force toward another position in said flow passage to initially isolate the fluid pressure at said source from the applied fluid pressure and thereafter effect a metered reduction of the applied fluid pressure, and opposed differential areas on said application means respectively responsive to the reduced applied fluid pressure and the isolated fluid pressure at said source to establish a reaction force in opposition to the other applied force.

2. The control valve according to claim 1 comprising means drivingly engaged with said application means and movable in response to the first named applied force to drive said application means in the one direction, and resilient means engaged between said other means and application means, said other means also being movable in response to the other applied force against said resilient means to drive said application means in the other direction.

3. A control valve comprising a housing having inlet, outlet and exhaust ports therein, piston means reciprocally movable in said housing, valve means in said piston means controlling pressure fluid communication between said ports, said piston means being movable in one direction in response to an applied force to move said valve means to a position interrupting pressure fluid communication between said outlet and exhaust ports and establishing pressure fluid communication between said inlet and outlet ports, said piston means also being movable in the other direction in response to another applied force to move said valve means to a position interrupting pressure fluid communication between said inlet and outlet ports and metering the established fluid pressure at said outlet port to the exhaust port, and opposed differential areas on said piston means respectively responsive to the fluid pressure at said inlet port and the reduced fluid pressure at said outlet port to establish a reaction force in opposition to the other applied force.

4. The control valve according to claim 3 comprising other piston means reciprocally movable in said first named piston means and having a force receiving end exteriorly of said housing, resilient means normally urging said other piston means into abutment with said first named piston means, said other piston means being movable in response to the first named applied force in the exterior end thereof to drive said first named piston means in the one direction, and said other piston means also being movable relative to said first named piston means and against said resilient means in response to the other applied force in said exterior end to drive said first named piston in the opposite direction.

5. The control valve according to claim 3 comprising a pair of valve seats on said piston means and said housing, said valve means being urged into engagement with one of said valve seats to interrupt pressure fluid communication between said inlet and outlet ports and movable with said piston means in the one direction into engagement with the other of said valve seats to interrupt pressure fluid communication between said outlet and exhaust ports, said piston means being further movable in the one direction to disengage said one valve seat from said valve means and establish pressure fluid communication between said inlet and outlet ports when said valve seat is engaged with said other valve seat, and said piston means also being movable in the opposite direction to re-engage said one valve seat with said valve means and thereafter disengage said one valve means from said other valve seat to effect the metered reduction of fluid pressure at said outlet port through said exhaust port.

6. A control valve for controlling the application of fluid pressure supplied from a source thereof to a fluid pressure responsive motor comprising a housing, piston means reciprocally movable in said housing, means within said housing including said piston means providing a pressure fluid flow passage for connection between said source and motor, an exhaust passage in said housing for connection with said motor, valve means in said piston means controlling pressure fluid flow through said flow passage and said exhaust passage, said piston means being movable in one direction in response to an applied force to move said valve means to a position closing said exhaust passage and effecting the application of the supplied fluid pressure through said flow passage, other means within said housing including said piston means defining a fluid pressure chamber, other valve means on said piston means controlling pressure fluid communication between said chamber and inlet port, said other valve means being movable with said piston means in the one direction to establish pressure fluid communication between said chamber and inlet port, an effective area on said piston means responsive to the fluid pressure at said inlet port upon the actuation of said other valve means to establish a directed force urging said piston means in the one direction, said piston means also being movable in another direction in response to another applied force to move said first named valve means to a position in said flow passage isolating the supplied fluid pressure from the applied fluid pressure and venting the applied fluid pressure to said exhaust passage to effect a metered reduction thereof, and another effective area on said piston means opposing said first named effective area and responsive to the applied fluid pressure to establish another directed force urging said piston means in the other direction, said first named and other directed forces defining a differential force in opposition to the other applied force and having a magnitude inversely proportional to the reduced applied fluid pressure when said chamber is connected in pressure fluid communication with said inlet port.

7. A control valve comprising a housing having inlet, outlet and exhaust ports therein, valve control means reciprocally movable in said housing and defining therewith a chamber, a pair of valve means on said valve control means controlling pressure fluid communication between said ports and between said inlet port and chamber, respectively, said valve control means being movable in one direction in response to an applied force to move one of said valve means to a position interrupting pressure fluid communication between said outlet and exhaust ports and establishing pressure fluid communication between said inlet and outlet ports and to move the other of said valve means to a position establishing pressure fluid communication between said inlet port and chamber, said valve control means also being movable in an opposite direction in response to another applied force to move one valve means toward a position isolating the fluid pressure at said inlet port from that at said outlet port and effecting a metered reduction of the fluid pressure at said outlet port, and opposed differential effective areas on said valve control means respectively responsive to the isolated fluid pressure at said inlet port and the fluid pressure at said outlet port to establish a differential reaction force in opposition to the other applied force when said chamber is connected in pressure fluid communication with said inlet port.

8. The control valve according to claim 7 comprising third valve means on said valve control means for controlling pressure fluid communication between said chamber and the atmosphere, said third valve means being movable to a position interrupting pressure fluid communication between said chamber and the atmosphere in response to the applied force movement of said valve control means in the one direction.

9. The control valve according to claim 8 comprising a valve seat on said housing between said chamber and the atmosphere, said third valve means including a sealing member on said valve control means normally disengaged from said valve seat to vent said chamber to the atmosphere, said sealing member being movable with said valve control means in the one direction into engagement with said valve seat to interrupt communication between said chamber and the atmosphere prior to the establishment of pressure fluid communication between said chamber and inlet port.

10. The control valve according to claim 7 comprising passage means in said valve control means for connection between said inlet and outlet ports, a first valve seat in said passage means, said one valve means being urged into engagement with said first valve seat to close said passage means, a second valve seat on said housing in circumscribing relation with said exhaust port, said one valve means being engaged with said second valve seat to close said exhaust port and said first valve seat being thereafter disengaged from said one valve means to open said passage means upon movement of said valve control means in the one direction, and said first valve seat being re-engaged with said one valve means to close said passage means isolating the fluid pressure at said inlet port from that at said outlet port and said one valve means being thereafter disengaged from said second valve seat to open said exhaust port effecting the metered reduction of the fluid pressure at said outlet port upon movement of said valve control means in the opposite direction.

11. The control valve according to claim 7 comprising passage means in said valve control means between said inlet and outlet ports, a first valve seat on said valve control means in circumscribing relation with said passage means, said one valve means being normally urged into engagement with said first valve seat to close said passage means, a second valve seat on said housing in circumscribing relation with said exhaust port, said one valve means being movable with said valve control means in the one direction into engagement with said second valve seat to close said exhaust port and said valve control means being thereafter further movable in the one direction relative to said one valve means to disengage said first valve seat from said one valve means and open said passage means, a third valve seat on said housing between said inlet port and chamber, said other valve means including a sealing member on said valve control means normally engaged with said third valve seat to close communication between said inlet port and chamber, said sealing member being movable with said valve control means in the one direction toward a position disengaged from said third valve seat to open communication between said inlet port and chamber prior to the actuation of said one valve means to open said passage means, said first valve seat being re-engaged with said one valve means to close said passage means and said one valve means being thereafter disengaged from said second valve seat to effect the metered reduction of fluid pressure at said outlet port through said exhaust port upon movement of said valve control means in the opposite direction, a fourth valve seat on said housing between said chamber and the atmosphere, and another sealing member on said valve control means normally disengaged from said fourth valve seat to communicate said chamber with the atmosphere, said other sealing member also being movable with said valve control means in the one direction into engagement with said fourth valve seat to close communication between said chamber and the atmosphere prior to the disengagement of said other sealing member from said third valve seat.

12. The control valve according to claim 7 comprising a valve seat on said housing between said inlet port and chamber, said other valve means including a sealing member on said valve control means normally engaged with said valve seat and movable with said valve control means in the one direction toward a position disengaged from said valve seat to connect said inlet port with said chamber.

13. The control valve according to claim 12 wherein the fluid pressure at said inlet port acting on one of said areas establishes a directed force urging said valve control means in the one direction and additive to the first named applied force when said sealing member is disengaged from said valve seat, the fluid pressure at said outlet port acting on the other of said areas to establish another directed force in opposition to the first named directed force and defining therewith the differential reaction force, another valve seat on said housing between said chamber and the atmosphere, and another sealing member on said valve control means normally disengaged from said other valve seat to vent said chamber to the atmosphere and movable with said valve control means in the one direction into engagement with said other valve seat prior to the disengagement of said first named sealing member from said first named valve seat.

14. The control valve according to claim 7 comprising plunger means movable with said valve control means and relative thereto, said plunger means being movable in response to the first named applied force thereon to effect movement of said valve control member therewith in the one direction, and resilient means engaged between said plunger means and valve control means, said plunger means being movable relative to said valve control means in the other direction and against said resilient means in response to the other applied force thereon.

15. The control valve according to claim 7 wherein said other valve means includes a peripheral surface on said valve control member, and a sealing member in said housing between said chamber and said inlet port, said peripheral surface being normally engaged with said sealing member to interrupt pressure fluid communication between said chamber and inlet port and movable to a position disengaged from said sealing member to establish pressure fluid communication between said chamber and inlet port upon movement of said valve control means in the one direction.

16. The control valve according to claim 7 comprising passage means in said valve control means between said inlet and outlet ports, a first valve seat on said valve control means in circumscribing relation with said passage means, a second valve seat on said housing in circumscribing relation with said exhaust port, said one valve means including a pair of interconnected valve elements for operative with said first and second valve seats, respectively, one of said valve elements being movable into engagement with said second valve seat to close said exhaust port and said first valve seat being thereafter movable to a position disengaged from the other of said valve elements to open said passage means upon movement of said piston means in the one direction, a third valve seat on said housing between said inlet port and chamber, said other valve means including a peripheral surface on said valve control means normally engaged with said third valve seat to close communication between said inlet port and chamber and movable toward a position disengaged from said third valve seat to open communication between said inlet port and chamber prior to the disengagement of said first valve seat from said other valve element, said first valve seat being re-engaged with said other valve element to close said passage means isolating the fluid pressure at said inlet port from that at said outlet port and said one valve element being thereafter disengaged from said second valve seat to meter the fluid pressure at the outlet port through said exhaust port upon the movement of said valve control means in the opposite direction, extension means on said valve means extending through said chamber and movable in said housing, a fourth valve seat on said housing between said chamber and the atmosphere, a sealing member on said extension means for operative engagement with said fourth valve seat, said sealing member being normally disengaged from said fourth valve seat to establish comunication between said chamber and the atmosphere and being movable into engagement with said fourth valve seat to interrupt communication between said chamber and the atmosphere prior to the disengagement of said peripheral surface from said third valve seat upon movement of said valve control means in the one direction.

17. The control valve according to claim 16 comprising a plunger member reciprocally movable in said extension means having an applied force receiving end exteriorly of said housing and an abutment interiorly of said housing for abutting engagement with said valve control means, and a reaction spring biased between said plunger member and extension means normally urging said abutment into engagement with said valve control means, said plunger member being movable in response to the first named applied force on said end thereof to concertly urge said valve control means in the one direction, and said plunger member also being movable relative to said valve control means and against said reaction spring in response to the other applied force on said end thereof to urge said valve control means in the opposite direction.

18. A control valve comprising a housing, application means movable in said housing for controlling pressure fluid flow therethrough, means for applying a force on said application means in opposite directions, said application means being movable in response to the force applied thereto in one direction toward a position in said housing effecting the application of fluid pressure supplied thereto through said housing, said application means also being movable in response to the force applied thereto in the other direction toward another position in said housing isolating the fluid pressure supplied thereto from the applied fluid pressure and venting the applied fluid pressure to the atmosphere, and said application means including opposed means respectively responsive to the isolated supplied fluid pressure and the reduced applied fluid pressure to oppose further applied force movement of said application means in the other direction.

No references cited.

CLARENCE R. GORDON, *Primary Examiner.*

UNITED STATES PATENT OFFICE
CERTIFICATE OF CORRECTION

Patent No. 3,366,142                                             January 30, 1968

Richard C. Bueler

It is hereby certified that error appears in the above numbered patent requiring correction and that the said Letters Patent should read as corrected below.

Column 9, line 26, for "move" read -- move said --; column 11, line 16, for "operative" read -- operative engagement --.

Signed and sealed this 18th day of March 1969.

(SEAL)
Attest:

Edward M. Fletcher, Jr.                              EDWARD J. BRENNER

Attesting Officer                                               Commissioner of Patents